(12) United States Patent
Montecucco

(10) Patent No.: US 7,828,003 B2
(45) Date of Patent: Nov. 9, 2010

(54) COLLAPSIBLE HUNTING BLIND

(76) Inventor: Tom Montecucco, 5017 W. Houston, Spokane, WA (US) 99208

( * ) Notice: Subject to any disclaimer, the term of this patent is extended or adjusted under 35 U.S.C. 154(b) by 0 days.

(21) Appl. No.: 12/038,131

(22) Filed: Feb. 27, 2008

(65) Prior Publication Data
US 2009/0211617 A1 Aug. 27, 2009

(51) Int. Cl.
*E04H 15/28* (2006.01)
*A01M 31/00* (2006.01)
(52) U.S. Cl. .................. 135/98; 135/117; 135/20.1; 135/901; 43/1
(58) Field of Classification Search .............. 135/15.1, 135/16, 33.2, 901, 20.1, 117, 98; 43/1–3; D3/5–16
See application file for complete search history.

(56) References Cited

U.S. PATENT DOCUMENTS

| | | | |
|---|---|---|---|
| 1,484,367 A | 4/1922 | Vincent | |
| 1,442,753 A | 1/1923 | Weinberg et al. | |
| 1,567,861 A | 12/1925 | Rothschild | |
| D101,291 S * | 9/1936 | Schrader | D3/6 |
| 2,319,118 A * | 5/1943 | Farkas et al. | 135/31 |
| 2,654,380 A * | 10/1953 | Eichenbaum | 135/33.2 |
| 3,055,382 A * | 9/1962 | Levison et al. | 135/33.41 |
| 3,184,235 A * | 5/1965 | Hilbrich | 473/421 |
| 4,590,699 A * | 5/1986 | Nicks | 43/2 |
| 5,214,872 A * | 6/1993 | Buyalos, Jr. | 43/1 |
| 5,655,557 A | 8/1997 | Martin | |
| 5,692,720 A * | 12/1997 | Griggs | 248/530 |
| 5,944,041 A * | 8/1999 | Kitchens | 135/98 |
| 6,167,894 B1 | 1/2001 | Lin | |
| 6,216,382 B1 * | 4/2001 | Lindaman | 43/2 |
| 6,296,005 B1 * | 10/2001 | Williams et al. | 135/98 |
| 6,385,895 B1 * | 5/2002 | Scaries | 43/2 |
| 6,745,787 B1 * | 6/2004 | Curtis | 135/98 |
| 6,775,943 B2 * | 8/2004 | Loughman | 43/2 |
| 6,925,745 B1 | 8/2005 | Alessi | |
| 7,185,665 B2 | 3/2007 | You | |
| 7,275,532 B2 * | 10/2007 | Niemackl et al. | 124/86 |
| D560,746 S * | 1/2008 | Bulger | D22/125 |
| 2005/0145272 A1 * | 7/2005 | Dubinsky-Witkowski | 135/16 |

OTHER PUBLICATIONS

"The Montana Decoy Turkey Flock"; 2 pages; http://www.guidesandlodges.com/mcpherson/PhotosTurkey/go.
"The Montana Decoy Turkey Flock"; 2 pages; http://www.guidesandlodges.com/mcpherson/Turkey_Index/go.

* cited by examiner

*Primary Examiner*—Winnie Yip
(74) *Attorney, Agent, or Firm*—Wells St. John P.S.

(57) ABSTRACT

A collapsible hunting blind is provided having a primary frame, a panel, an image of a game animal, and a secondary frame. The primary frame has a folded position and an unfolded position. The panel is supported by the primary frame and has a front surface, a rear surface, and an outer periphery. The panel is supported by the primary frame between the folded position and the unfolded position. The image of a game animal is provided on the front surface. The secondary frame communicates with the panel and is configured to hold the primary frame and the panel in the unfolded position.

18 Claims, 12 Drawing Sheets

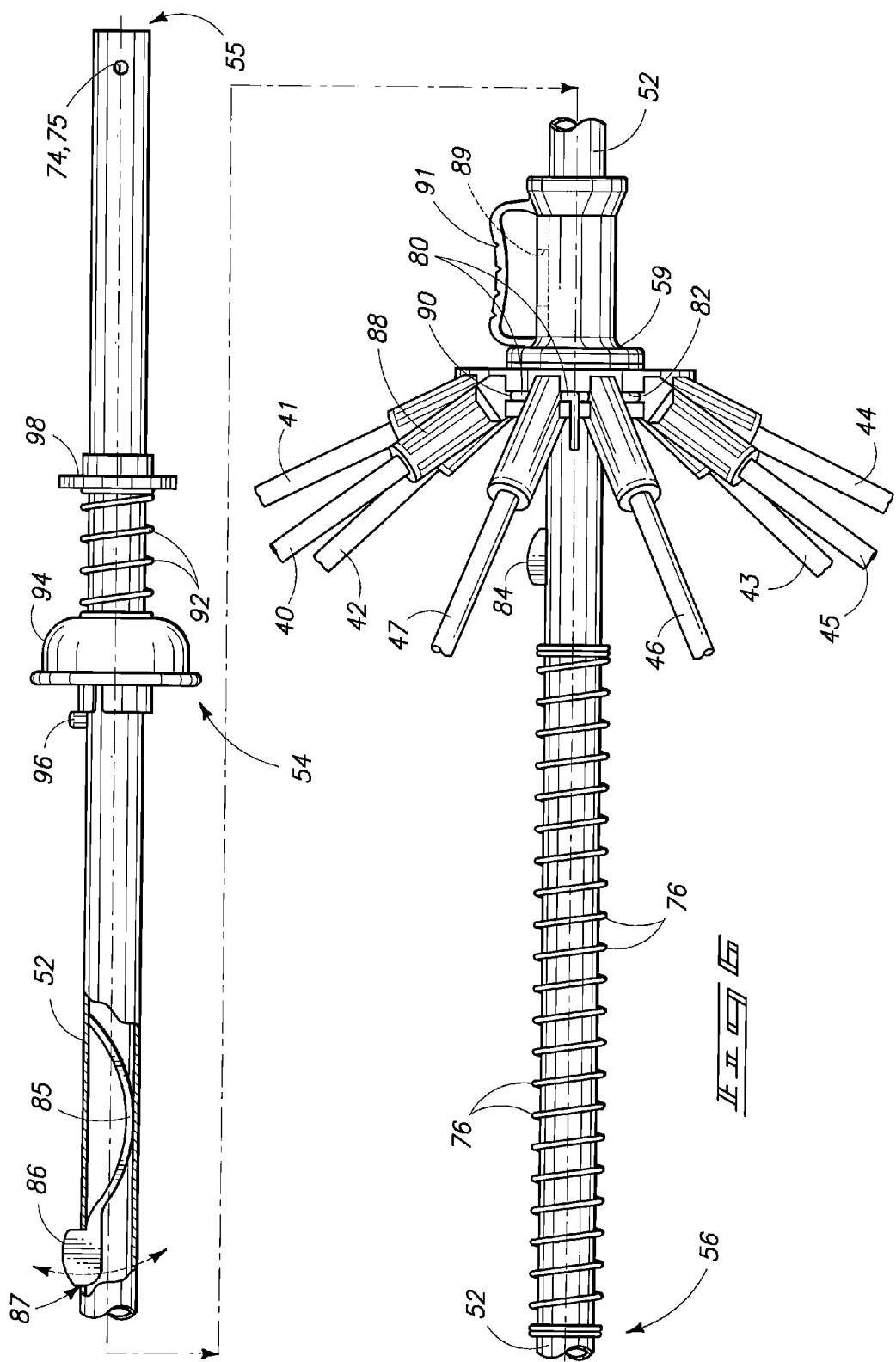

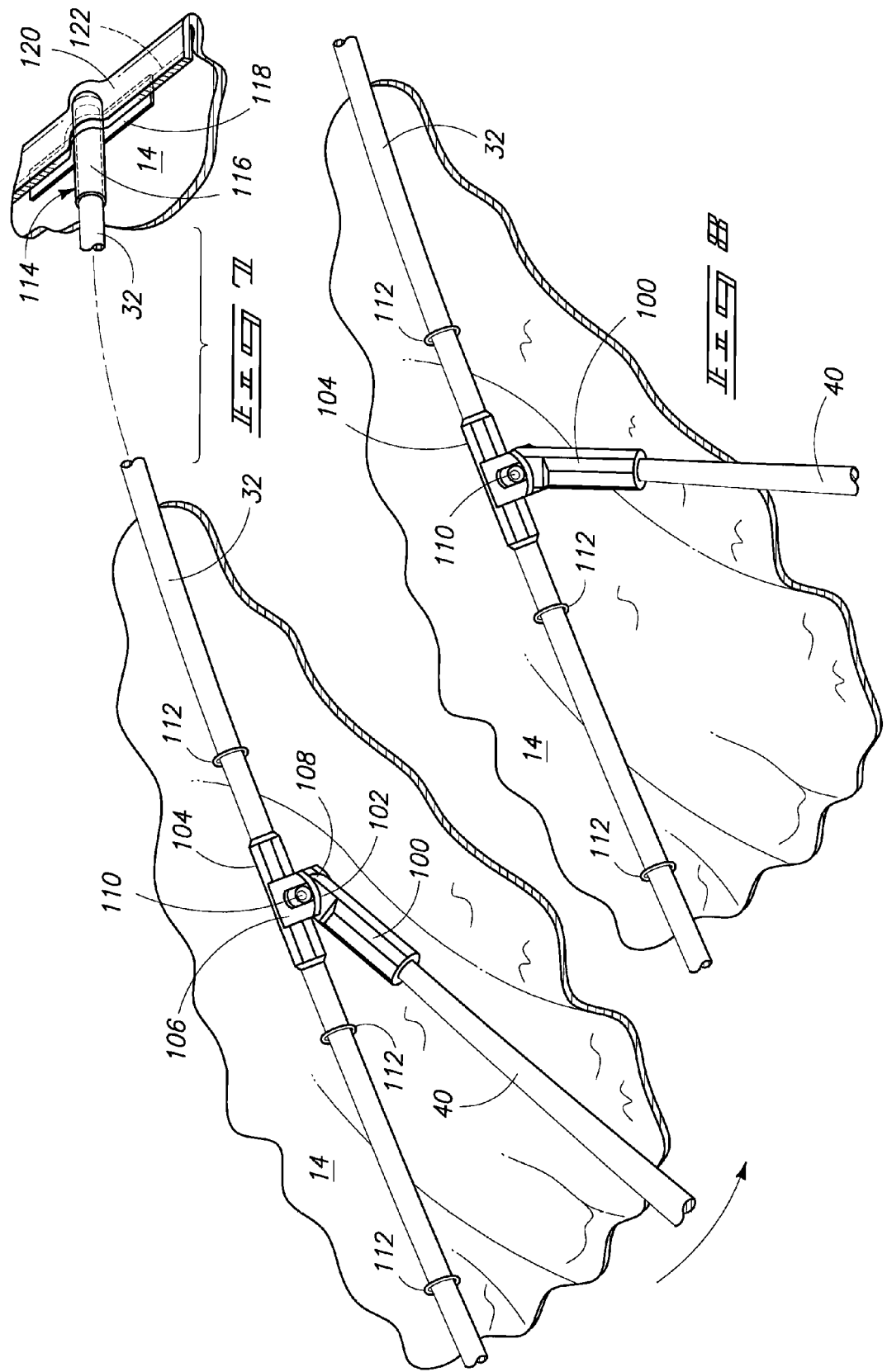

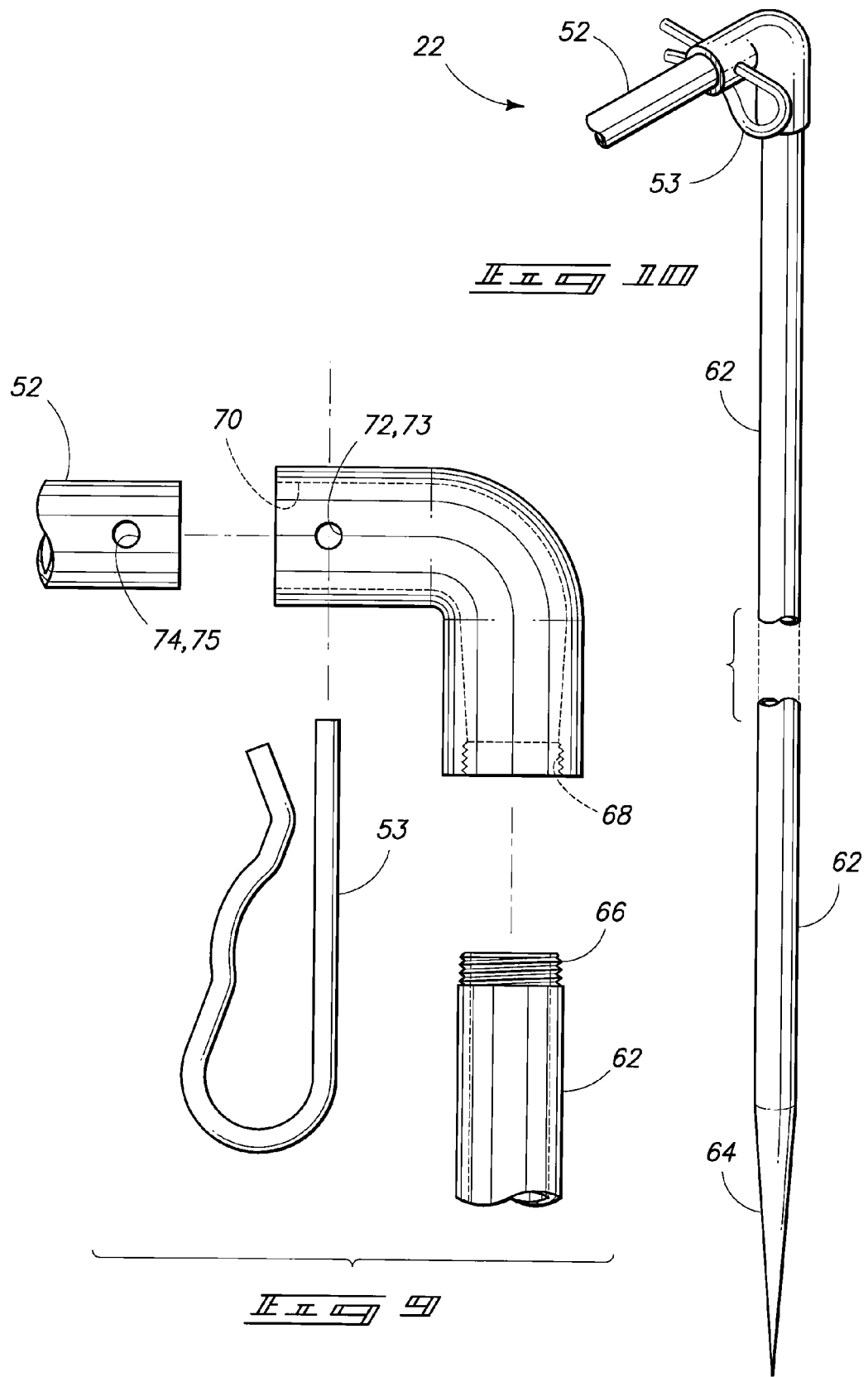

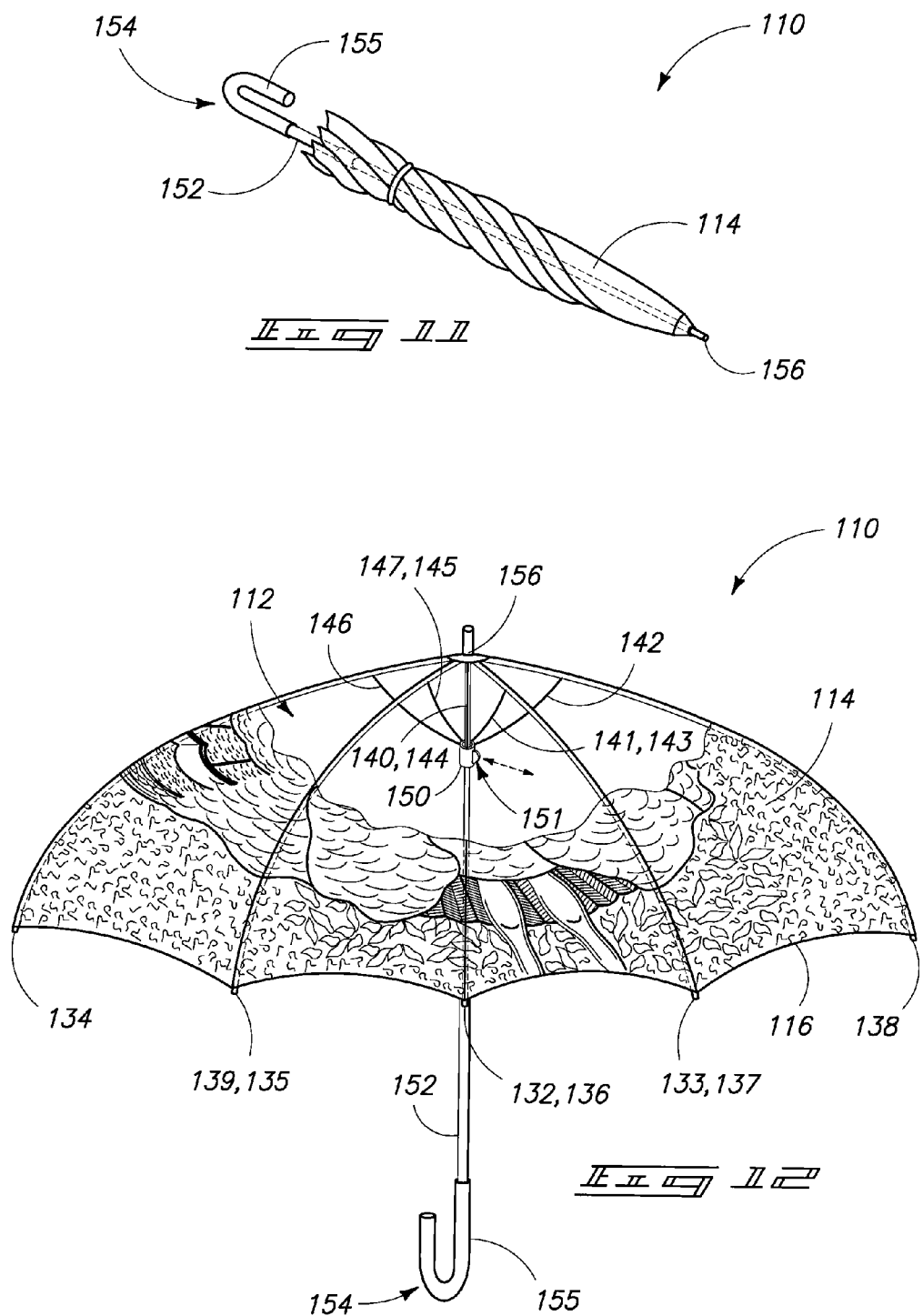

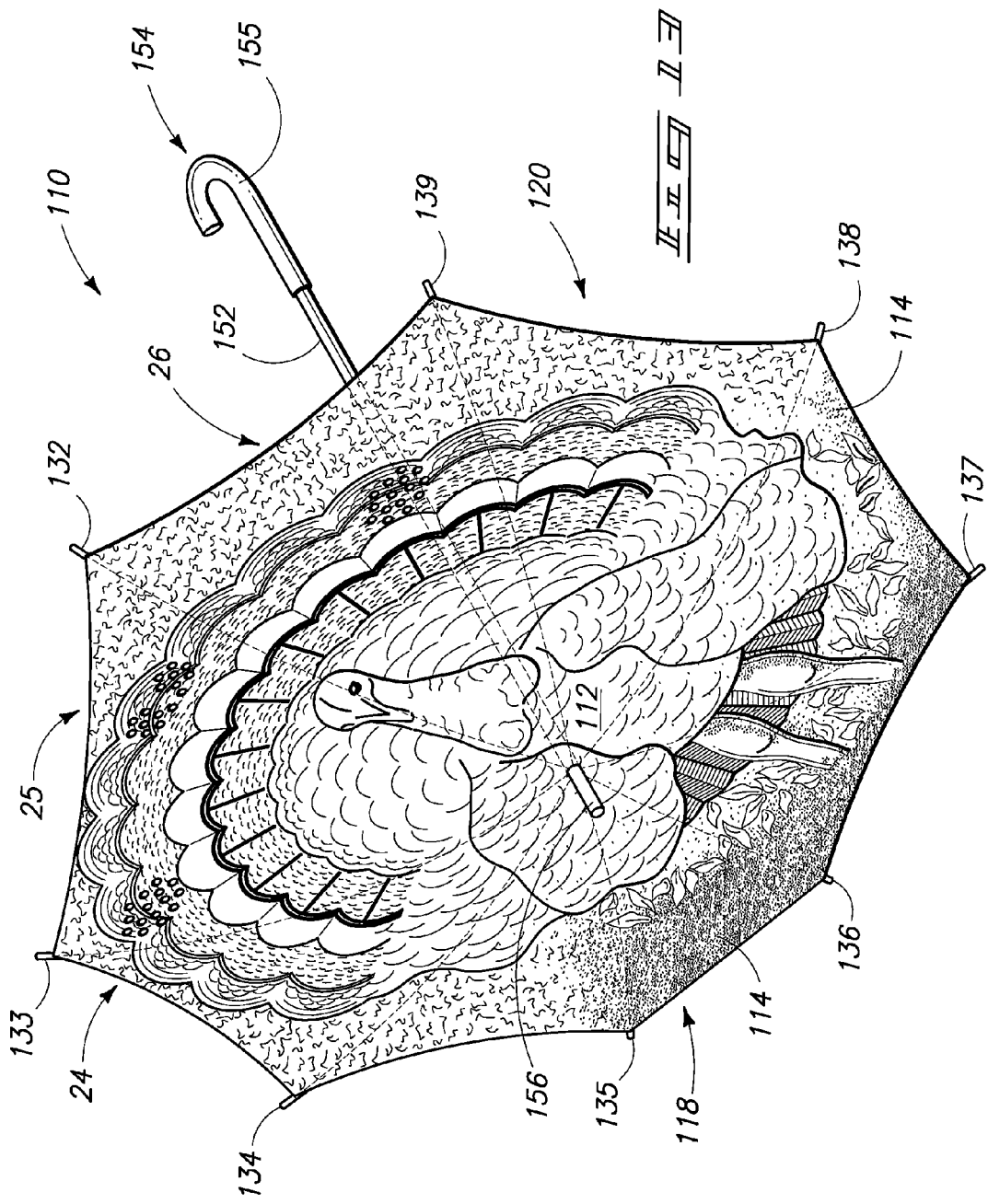

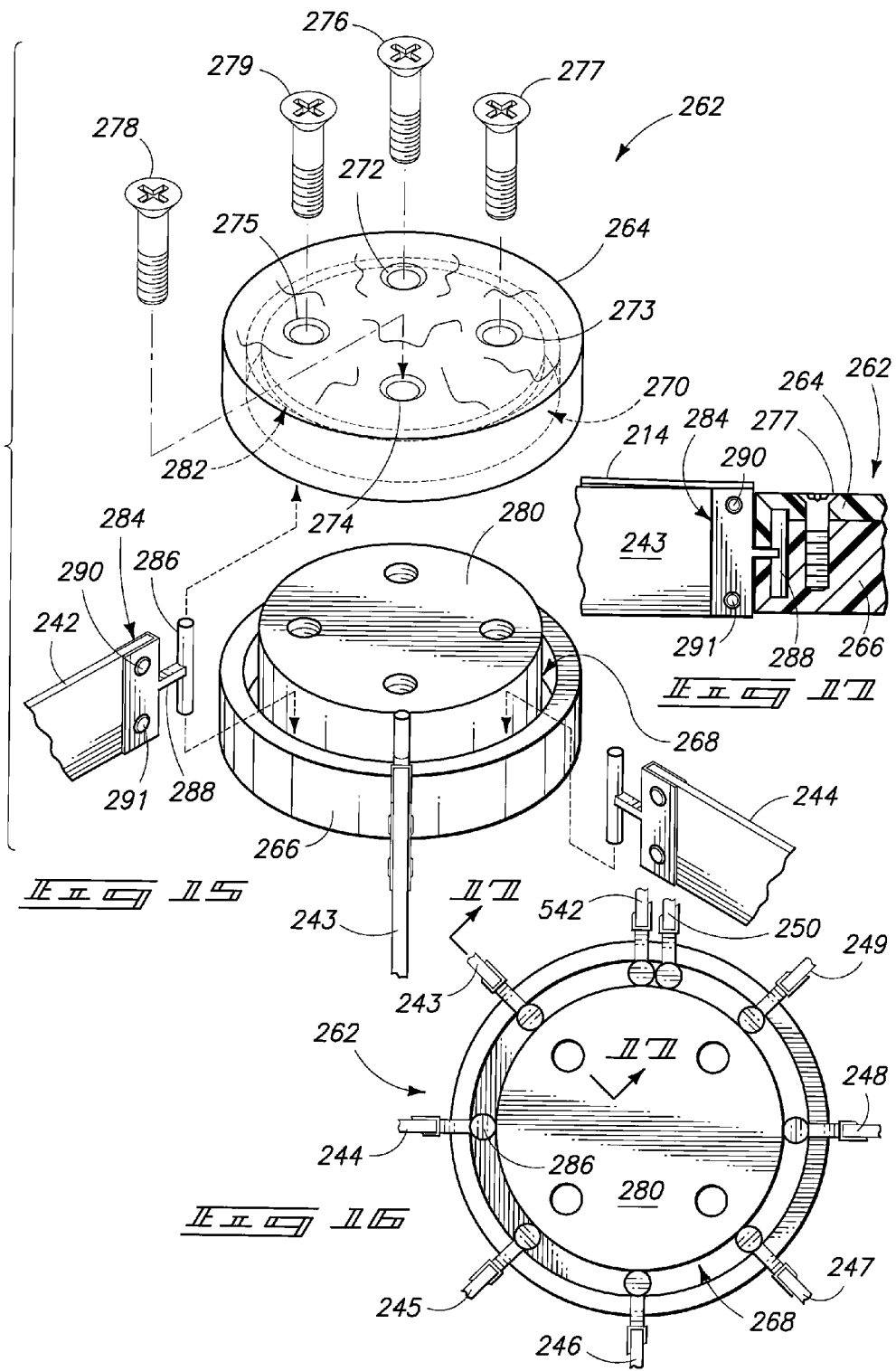

COLLAPSIBLE HUNTING BLIND

TECHNICAL FIELD

This invention pertains to hunting concealment devices. More particularly, the present invention relates to decoys and blinds used by hunters when hunting game animals such as turkeys.

BACKGROUND OF THE INVENTION

Decoys are known for enticing and deceiving game animals to enable a hunter to shoot the game animals. For the case of waterfowl hunting, waterfowl decoys are placed in an area to entice game animals to approach the decoys, placing them into shooting range of the hunter. However, the hunter still needs to hide from view of the game animals as they approach.

Blinds are known for concealing hunters from game animals to enable hunters to come within sufficient proximity of the game animals to shoot the game animals. Typically, blinds include camouflage exterior surfaces that match surrounding scenery. For example, a blind used in a wooded area can be provided with a cloth exterior having an exterior color print including tree bark and leaves indigenous to the hunting area. The hunter hides behind or within the blind until an opportunity arises to surprise the game when it comes within proximity of the blind. Furthermore or alternatively, a hunter wears camouflage clothing that matches the surroundings so the hunter blends into the natural surroundings. For the case where the game animals are ducks or geese, the hunter might additionally use duck or geese decoys that are placed in close proximity with the blind to entice the game animals into close proximity with the hunter.

Improvements are needed to combine decoy and blind features into a simple and portable device that entices game animals into shooting range proximity of a hunter, while also concealing the hunter from the game animals being hunted.

SUMMARY OF THE INVENTION

A combination decoy and hunting blind is provided in a portable and lightweight configuration to attract game animals while also concealing a hunter from the game animals. More particularly, a turkey decoy and hunting blind is provided by a portable structure.

According to one aspect, a collapsible hunting blind is provided having a primary frame, a panel, an image of a game animal, and a secondary frame. The primary frame has a folded position and an unfolded position. The panel is supported by the primary frame and has a front surface, a rear surface, and an outer periphery. The panel is supported by the primary frame between the folded position and the unfolded position. The image of a game animal is provided on the front surface. The secondary frame communicates with the panel and is configured to hold the primary frame and the panel in the unfolded position.

According to another aspect, a collapsible bird hunting blind is provided having a first frame member, a panel, an image of a game animal, and a second frame member. The first frame member has a folded orientation and an unfolded orientation. The panel overlays the first frame member. The panel has a front surface, a rear surface, and an outer periphery. The first frame member supports the panel in a membrane tensioned state when the resilient frame member is in the unfolded orientation. The image of a game animal is provided on the front surface. The second frame member communicates with the first frame member and is configured to hold the first frame member and the panel in the unfolded orientation.

According to yet another aspect, a hunter concealment device is provided having a canopy frame, a panel and an image of a game animal. The canopy frame has a shaft, a central hub, a plurality of ribs each pivotally coupled at a radial inner end to the hub, a sliding ring, and a radial array of stretchers each pivotally coupled at one end with the sliding ring and pivotally coupled at another end with a respective rib. The central hub is carried by the shaft. The sliding ring is mounted for movement along the shaft. Movement of the sliding ring along the shaft towards the central hub is operative to kinematically articulate the canopy frame between a folded orientation and an unfolded orientation. The panel has a front surface, a rear surface, and an outer periphery. The panel is supported by the canopy frame between stowed and deployed configurations. Then image of a game animal is provided on the front surface of the panel.

BRIEF DESCRIPTION OF THE DRAWINGS

Preferred embodiments of the invention are described below with reference to the following accompanying drawings.

FIG. 4A is an optional configuration including a footstep mounted on the support post for the post assembly on the hunting blind of FIG. 4.

FIG. 6 is an enlarged partial side view of selected structural components provided on the shaft of the hunting blind of FIGS. 1-5.

FIG. 7 is a simplified partial view in breakaway illustrating one exemplary rib and stretcher for the hunting blind of FIGS. 1-6 shown articulated during an opening operation.

FIG. 8 is a simplified partial perspective view and breakaway corresponding with that FIG. 7, but showing the exemplary rib and stretcher in a fully deployed configuration.

FIG. 9 is an enlarged and exploded partial component side view of an elbow and post assembly for the turkey hunting blind of FIGS. 1-8.

FIG. 10 is an enlarged partial perspective view of the elbow and post assembly of FIG. 9.

FIG. 11 is a perspective view of a collapsed turkey hunting blind with a decoy image, according to another aspect of the present invention.

FIG. 12 is a side view of the turkey hunting blind of FIG. 11 expanded, or deployed.

FIG. 13 is a perspective of the turkey hunting blind of FIGS. 11-12.

FIG. 15 is an exploded partial perspective view of a central hub on the hunting blind of FIG. 14.

FIG. 16 is plan view of the hub of FIG. 15 taken from above.

FIG. 17 is a partial sectional view of the hub and taken along line 17-17 of FIG. 16 and further showing a rib.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to preferred embodiments of Applicant's invention for a hunting blind having a decoy image on a front surface. While the invention is described by way of preferred embodiments, it is understood that the description is not intended to limit the invention to such embodiments, but is intended to cover alternatives, equivalents, and modifications which may be broader than the embodiments, but which are included within the scope of the appended claims.

In an effort to prevent obscuring the invention at hand, only details germane to implementing the invention will be described in great detail, with presently understood peripheral details being incorporated by reference, as needed, as being presently understood in the art.

Figure 1:
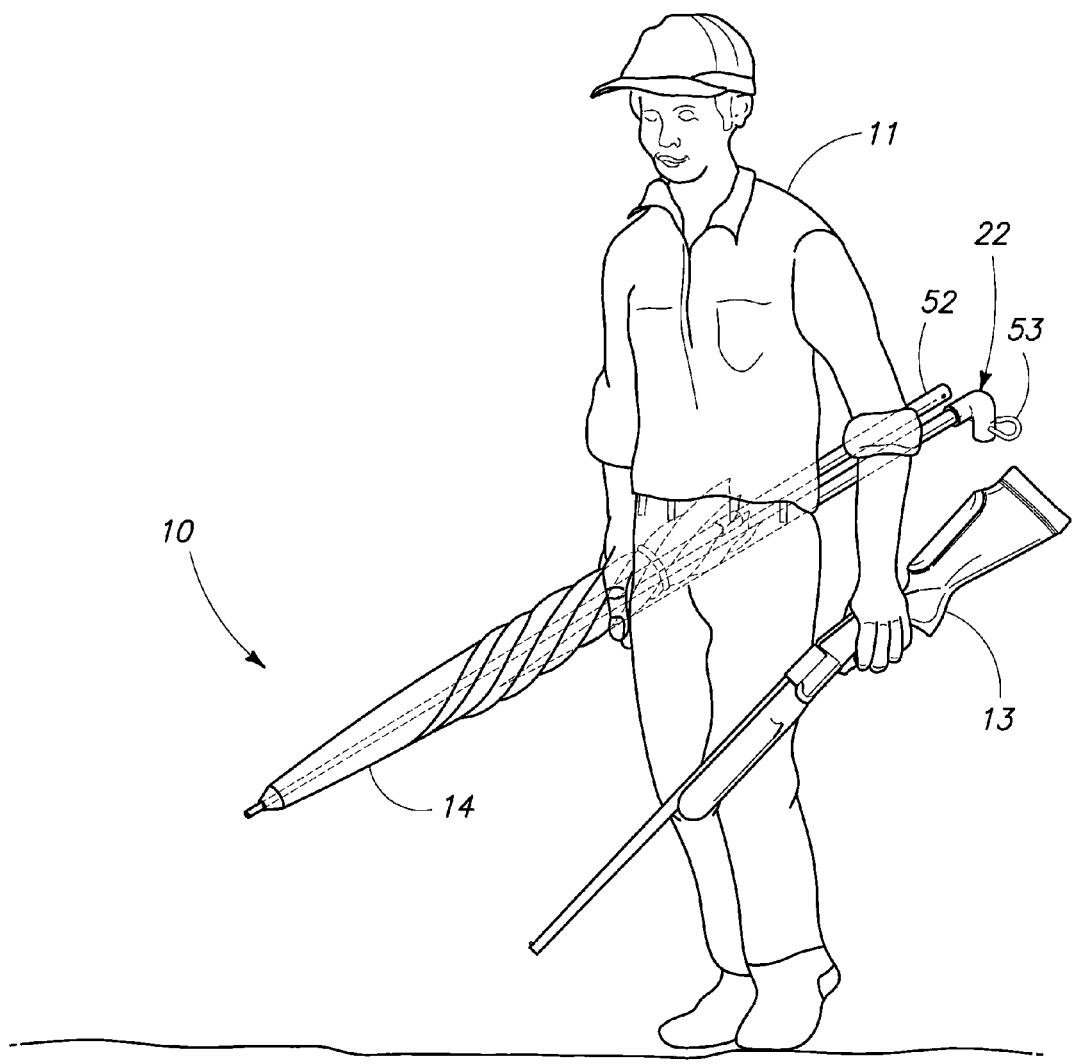
FIG. 1 is a perspective view of a hunter carrying a collapsed turkey hunting blind that has a decoy image, according to one aspect of the present invention.
Figure 2:
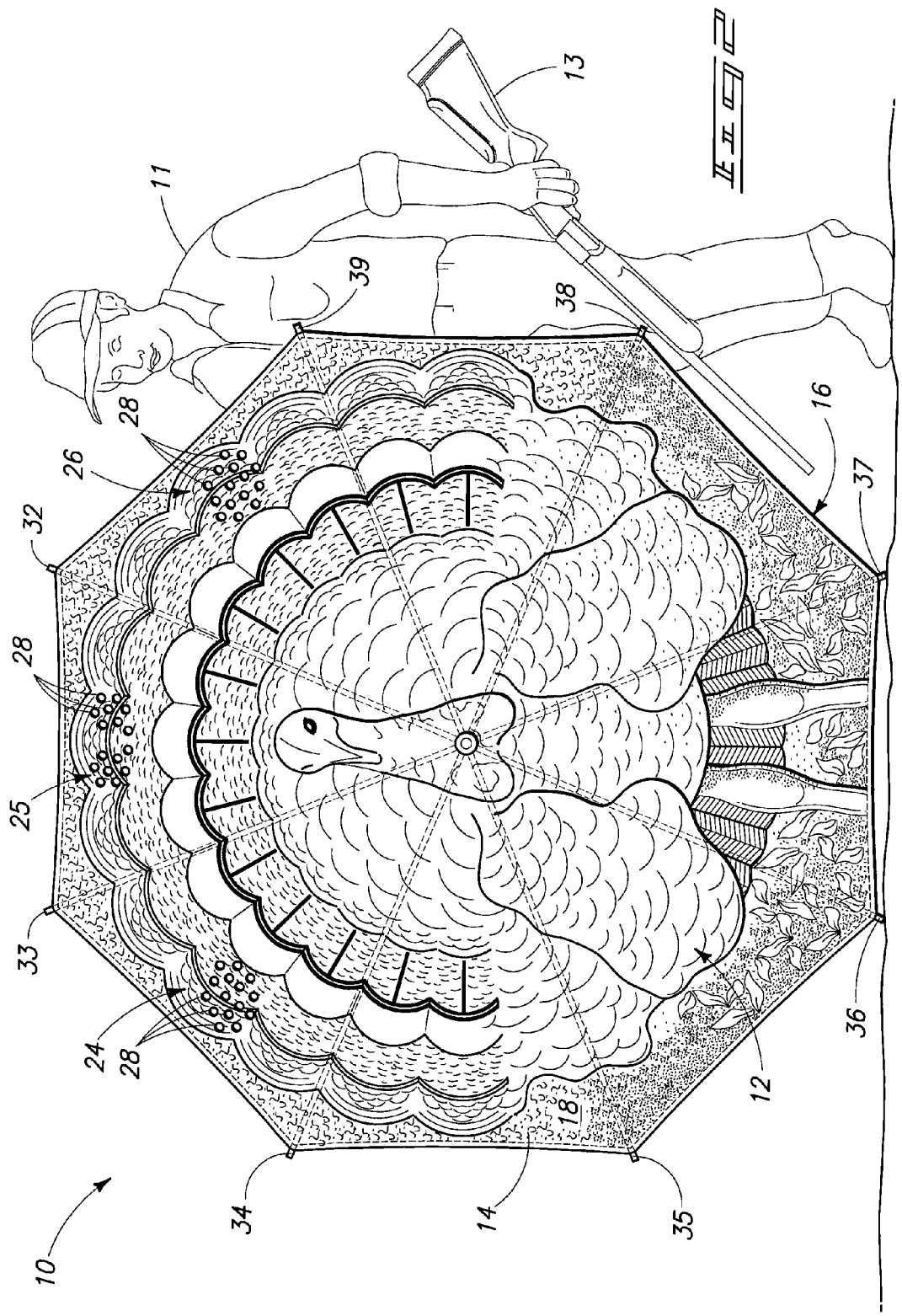
FIG. 2 is a vertical front surface view of the hunter with the turkey hunting blind deployed into an expanded configuration that presents the decoy image to game animals and enables the hunter to hide behind the blind.
Figure 3:
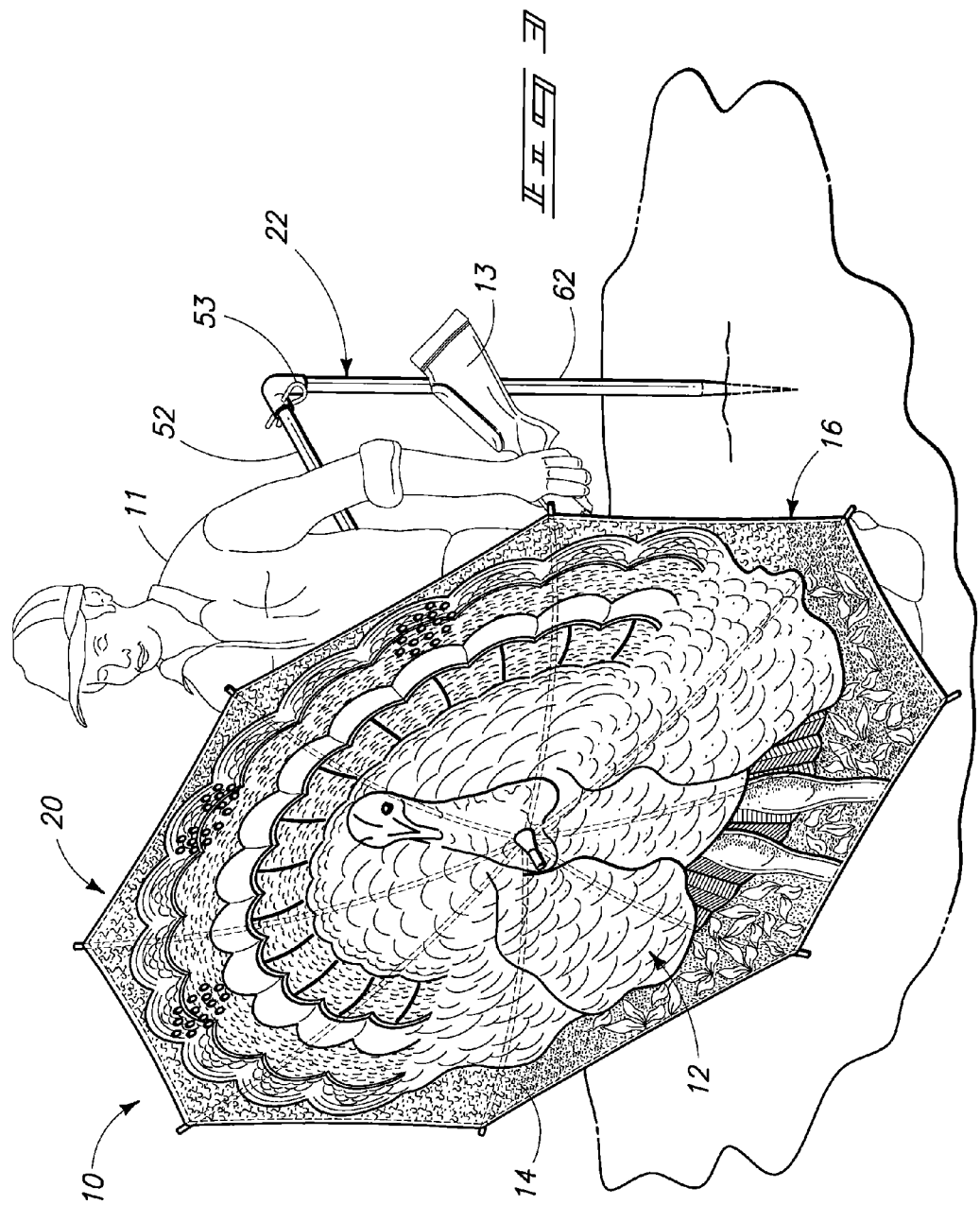
FIG. 3 is a perspective view of the turkey hunting blind of FIGS. 1-2.

FIGS. 1-10 illustrate a portable hunting blind, or shield having a bird decoy image on a front face, identified by reference numeral 10. Blind 10 is constructed for easy transport while stowed, as shown in FIG. 1, and fast deployment while in use, as shown in FIGS. 2-3. According to FIGS. 2-3, blind 10 includes a decoy image 12 of a turkey provided on a front surface 18 of a fabric panel 14, which is used to attract a turkey. Optionally, other game animals could be provided on the front surface 18 of panel 14, such as other birds or mammals. According to one construction, blind 10 terminates in an octagonal outer periphery 16 and is sized to conceal one or more hunters from game birds along a rear surface 20. Optionally, the outer periphery can be round, oval, square, or of any other suitable geometric configuration.

During experimental field testing, it has been discovered that wild turkeys unexpectedly react in an instinctive manner when they see image 12 on blind 10. More particularly, a seemingly uncontrollable instinctive response is generated in a male turkey when they see image 12. The male turkey will approach blind 10 in order to protect his territory. Although it is not understood completely, it is presently believed that the size of image 12 contributes to this seemingly instinctive response. More particularly, the image is larger than a real turkey. For example, the experimentally tested prototype had a turkey image with a surface area fifty percent greater than that of a real turkey. During testing, it was learned that inadvertent clues to the presence of humans did not seem to deter turkeys from instinctively approaching blind 10. For example, in one case a video camera was visibly held above blind 10, yet a male turkey was not frightened by the otherwise unnatural event. In another case, blind 10 was blown sideways by a gust of wind, yet the male turkey merely stopped their approach, only to resume the aggressive approach as soon as the blind 10 was put back into position. Wild turkeys are known to be very wary of humans, and this behavior was found to be unusual and advantageous to a hunter.

As shown in FIG. 1, hunting blind 10 can be collapsed and carried by a hunter 11 in one hand. This collapsed configuration facilitates transport of blind 10 to a hunting location by hunter 11 when it is in a collapsed state. Since the collapsed configuration of blind 10 is quickly and easily converted to an un-collapsed, or deployed configuration, it is relatively easy for hunter 10 to move hunting blind 10 from one location to another location, as well as carry the collapsed blind 10 through brush and foliage when approaching and leaving various hunting locations.

Typically, hunter 11 will carry hunting blind 10 in one hand while carrying a shotgun 13 in another hand, as shown in FIG. 1. More particularly, hunter 11 carries blind 10 by concurrently grasping a post assembly 22 and a central shaft 52 of blind 10. Post assembly 22 is shown disassembled from shaft 52 to facilitate transport and stowage. A wire clip 53 of spring steel is stowed on post assembly 22 for use in retaining post assembly 22 onto an end of shaft 52, as will be show below in greater detail with reference to FIGS. 3-5. A flexible cloth panel 14 is folded and wrapped around shaft 52 when collapsed in order to facilitate transport and stowage. In this state, the panel can be secured with a cloth strap having end fasteners, such as snaps or hook-and-loop fasteners. A middle segment of the cloth strap is sewn onto the panel to prevent loss.

FIG. 2 illustrates hunting blind 10 in an unfolded, or deployed configuration so as to present an image 12 of a game animal, or turkey in an outward direction towards targeted living game animals. Image 12 serves to entice a living game animal to approach blind 10 while hunter 11 is hidden behind blind 10, concealed from view by the living game animal. Once the targeted living game animal has approached within shooting range, hunter 11 steps from behind blind 10 with gun 13 to target the animal.

According to one construction, panel 14 is sewn together using eight triangular pieces of fabric that are sewn together along adjacent edges so as to form a three-dimensional fabric panel. Optionally, a single sheet of fabric can be used to provide a flat panel. Panel 14 can be constructed using any suitable membrane material including fabrics, such as cotton, nylon, wool, canvas, Dacron, woven plastics, or other web materials, such as plastic, mylar, or other suitable flexible film materials.

Optionally or additionally, panel 14 can be constructed with screen mesh fabric that enables a hunter to see through the panel, but still enables an image to be placed on the panel that obscures the hunter from a game animal. Further optionally or additionally, panel 14 can include one or more slots or slits that enable airflow to transfer through the panel. For example, one or more radial, arcuate and/or tangential slots or slits can be formed in panel 14 to facilitate airflow through such panel which will significantly stabilize the hunting blind when being utilized in windy conditions.

As shown in FIGS. 2 and 3, image 12 is placed onto panel 14 by airbrushing paint onto panel 14. Optionally, any of a number of techniques can be used to form an image onto panel 14 including by silk screening, inkjet printing, digital printing, applying decals, or using any other image transfer technique suitable for use on a panel.

As shown in FIG. 2, panel 14 includes three separate viewing screens 24-26, each formed from a plurality of spaced apart apertures, or viewing holes 28. As shown in FIG. 3, apertures 28 are sized and spaced apart with appropriate dimensions so that a hunter can look through panel 14 without giving their presence away to a game bird. Preferably, the size and spacing between apertures 28 are such that they are not readily visibly discernible to a game bird, but are hidden in the decoy image 12 on panel 14 so as to render them visually imperceptible by a game bird. Viewing screen 25 is provided above a center position of panel 14, whereas viewing screens 24 and 26 are provided laterally of viewing screen 25, as shown in FIG. 2. The provision of multiple viewing screens enables multiple hunters to conceal themselves behind blind 10, while also allowing each hunter to view game birds through panel 14.

Figure 4:
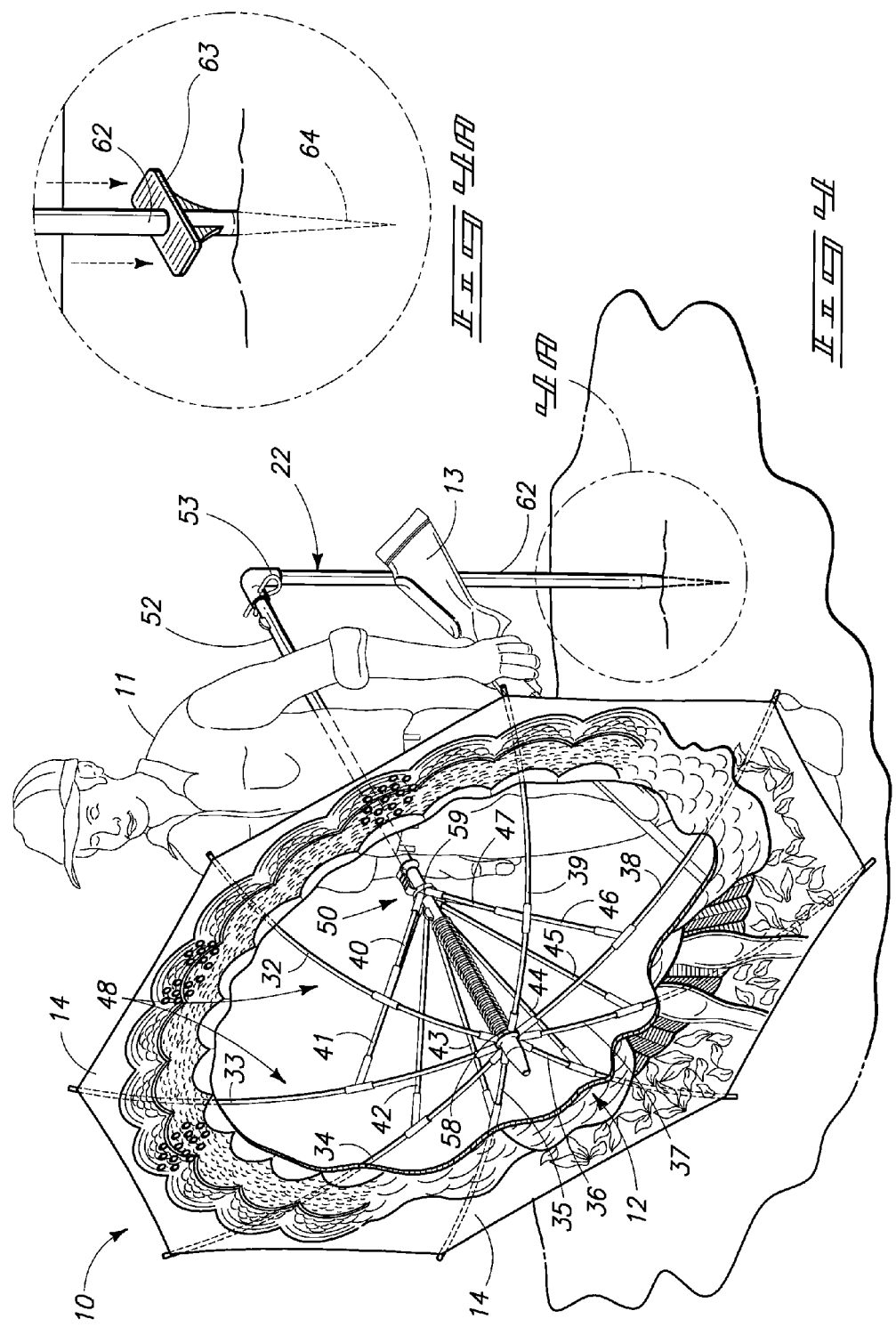
FIG. 4 is a perspective view in partial breakaway of the turkey hunting blind of FIG. 3.

Hunting blind 10 is supported in an unfolded configuration by a primary, or first frame 48 comprising a plurality of ribs 32-39 radiating outward from a central hub 58 provided on a distal end of a shaft 52, as shown in FIG. 4. A secondary frame 50 holds the primary frame 48 in an unfolded, or deployed position. Secondary frame 50 comprises a plurality of stretchers 40-47 each pivotally coupled with a respective rib 32-39 of primary frame 48 to form a radiating array extending outwardly from a sliding ring 59 provided about central shaft 52. While outer ends of stretchers 40-47 are pivotally coupled with ribs 32, 39, respectively, an inner end of each stretcher 40-47 is pivotally coupled with sliding ring, as will be described below in greater detail with reference to FIG. 5.

As shown in FIGS. 3 and 4, hunting blind 10 is provided with a post assembly 22 that is releasably attached onto a proximal end of shaft 52. Post assembly 22 supports blind 10 in a desired deployed configuration without requiring a hunter to manually hold blind 10 in this configuration. Optionally, blind 10 can be manually held by hunter 11 (or an accomplice) via shaft 52 without using post assembly 22. An optional construction, shown in FIGS. 10-12 does not include a post assembly.

Post assembly 22 is releasably retained onto proximal end of shaft 52 with a wire clip fastener 53. As shown in FIGS. 3 and 4, post assembly 22 is formed with a single vertical support post 62 that is manually urged into the ground by a user. In one case, a user applies pressure on top of post assembly 22, forcing post 62 into the ground. Optionally, one or more foot pegs, or steps (such as step 53 of FIG. 4A) can be secured onto post 62, using welds or fasteners. In use, a user merely applies downward force with their foot onto step 53 in order to drive post 62 into the ground. Further optionally, a post assembly can be formed with multiple posts that form a tripod, such as a two or three leg tripod having lateral stays or straps extending between adjacent legs configured to hold the legs in a desired tripod configuration, eliminating any need to drive a post into the ground and enabling use on hard surfaces.

Figure 5:
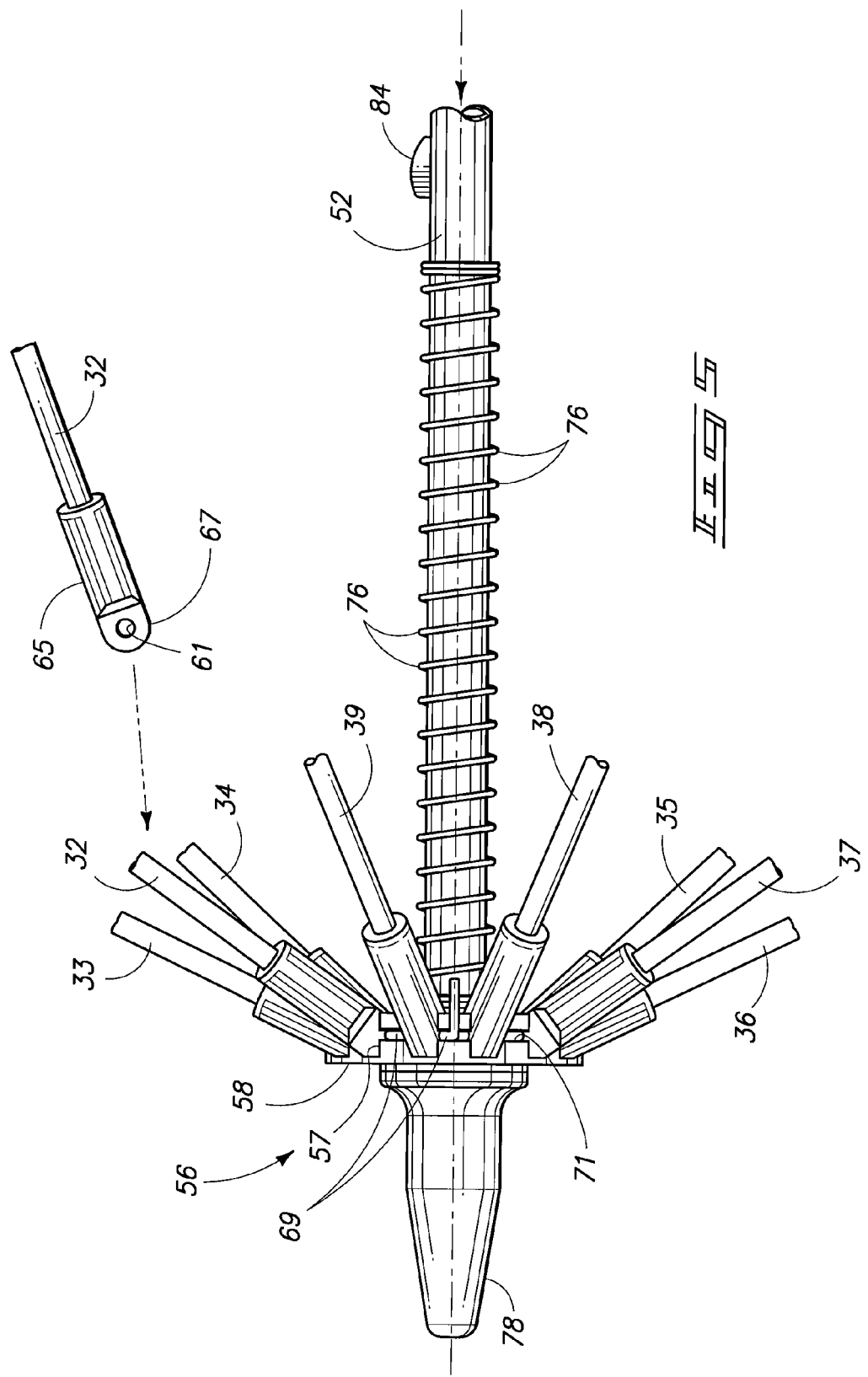
FIG. 5 is an enlarged partial side view in breakaway of structural components on the distal end of the shaft for the hunting blind of FIGS. 1-4.

FIG. 5 illustrates construction details for mounting individual ribs 32-39 onto hub 58 at distal end 56 of shaft 52. More particularly, hub 58 is rigidly secured onto distal end of shaft 52 with adhesive or a fastener. Hub 58 has a radially-inwardly projecting circumferential groove, or slot 71. Individual cross slots 57 are cut across slot 71 and into hub 58 at circumferential locations corresponding to the locations where ribs 32-39 attach to hub 58 via individual end fittings 65. Each end fitting 65 has a cylindrical bore 61 in which a respective end of a rib is adhesively received and secured. According to one construction, fitting 65 can be constructed from plastic, metal, or Nylon material. An eyelet 67 is formed on each end fitting 65. Each eyelet 67 is received into the respective cross slot 57 such that bore 61 aligns with slot 71, after which a wire 69 is passed through bore 61 in each end fitting 65. Wire 69 forms a hoop that is then reduced in diameter by twisting free ends of the wire, closing the diameter of the hoop formed by the wire 69, and thereby urging each end fitting 65 into each respective slot and seating the wire 69 within groove 71.

A blunt, protective end cap 78 is secured onto hub 58 and over distal end 56 of shaft 52. Optionally, cap 78 can be reduced in size or eliminated. According to one construction, cap 78 is adhesively secured onto hub 58. According to another construction, a snap-fit connection is provided between cap 78 and hub 58. A cylindrical coil steel spring 76 is provided on an opposite side of hub 58, about shaft 52.

FIG. 6 illustrates construction details adjacent distal end 56 and proximal end 54 of shaft 52. More particularly, shaft 52 is formed from a tubular piece of carbon fiber composite material. Alternatively, shaft 52 can be performed from one or more segments of aluminum or steel tubular material. Even furthermore, shaft 52 can be formed from a solid piece of material such as a metal or wood dowel. Adjacent distal end 56 of shaft 52, a cylindrical coil spring 76 is provided coaxially about shaft 52. Sliding hub 59 is provided for coaxial movement along shaft 52 into various positions that articulate structures 40-47 when opening and closing the umbrella structure of line 10 provided by the primary frame and secondary frame of the hunting blind. A pair of spring catches 84 and 86 is provided at selected spaced-apart locations along shaft 52 for securing a sliding ring 59 at such respective locations. A slot 89 within sliding ring 59 receives a respective spring catch 84 and 86 therein to lock sliding ring 59 at such respective location.

More particularly, spring catch 86 comprises a stamp steel finger having a widening flange retained within a slot 87 of shaft 52 and a curved leaf spring 85 that extends from the finger of spring catch 86 so as to upwardly urge the exposed portion of spring catch 86 in a radially outward direction of shaft 52. According to one construction, sliding ring 59 is formed from a plastic material having a flexible bridge 91. A user merely physically depresses flexible bridge 91 toward shaft 52 in order to inwardly urge spring catch 84 or 86 sufficient that a perpendicular locking portion on spring catch 84 or 86 clears slot 89 of sliding ring 59 in order to free sliding ring 59 from movement along shaft 52. Spring catch 84 is constructed in a manner similar to spring catch 86.

As shown in FIG. 6, an end fitting 88 is adhesively affixed onto each stretcher 40-47 with a single hoop of wire 80 being received through individual eyelets 90 on each end fitting 88 within a radially inwardly extending circumferential slot or groove 82 provided in sliding ring 59.

As shown in FIG. 6, proximal end 54 of shaft 52 includes a rigidly affixed stop collar 98 that is secured via adhesive or fasteners, such as a rivet or a screw, onto shaft 52. A cylindrical coil spring 92 is seated against stop collar 98 and a slider cap 94 has a cylindrical bore and is received for sliding reciprocation along shaft 52, but is limited as to outward movement by a stop pin 96 that is pressed into a hole in shaft 52. Cap 94 is physically urged toward stop collar 98, depressing spring 92 in order to insert the radial outer most ends on each rib 32-39 (see FIG. 5) when the hunting blind is in a folded configuration for stowage. When upfolding the blind, a user merely urges cap 94 towards stop collar 98, squeezes flexible bridge 91 to compress spring catch 86 and sliding ring 59 along shaft 52 towards distal end 56 for engagement atop spring catch 84. A pair of bores 74 and 75 is provided opposite one another through shaft 52 at proximal end 54 adjacent the tubular end 55 of shaft 52.

FIG. 7 illustrates the kinematic articulation of one complementary rib 32 and stretcher 40 as the hunting blind is being deployed from a folded to an unfolded configuration. FIG. 7 depicts stretcher 40 as sliding ring 59 (see FIG. 6) is being moved from spring catch 86 toward spring catch 84. FIG. 8 illustrates rib 32 and stretcher 40 in a fully deployed configuration where sliding ring 59 is engaged over spring catch 84 (see FIG. 6).

More particularly, each stretcher, such as stretcher 40 terminates at a distal end with an end fitting 100 that has a bore in which stretcher 40 is adhesively affixed therein. Loops of thread 112 are used to secure rib 32 to panel 14 at spaced apart locations. Remaining ribs are similarly secured to panel 14. End fitting 100 has an eyelet 102 formed in an arm 108. Another tubular fitting 104 having a through bore is received over rib 32 and is adhesively affixed at a selected location onto rib 32. Tubular fitting 104 has a pair of arms 106 and 107 between which arm 108 is received. A bore in each arm 106 and 107 receives a rivet 110 that secures through eyelet 102 to pivotally secure member 100 onto member 104. According to one construction, fittings 100 and 104 can be made from plastic, metal or Nylon® material.

Each rib, such as rib 32 terminates in a molded plastic end cap assembly 114 that includes a cylindrical cap 116 and an integrally molded and laterally extended cross web 118. An outer periphery 120 of panel 14 is folded over onto web 118 where it is secured with stitches 122.

As shown in FIG. 8, member 100 pivots relative to member 104 as each rib is pivoted relative to each respective stretcher. Accordingly, the primary frame 48 and secondary frame 50 of hunting blind 10 (see FIG. 4) cooperate as a kinematic linkage when deploying and stowing blind 10.

U.S. Pat. Nos. 1,442,753; 1,484,367; 1,567,861; 5,655,557; 6,167,894; and 7,185,665, herein incorporated by reference, illustrate several alternative constructions suitable for providing a kinematic linkage, including a primary frame and a secondary frame, usable to implement features of the present invention. In fact, any known construction for an umbrella frame can be incorporated into a hunting blind of the present invention.

FIGS. 9 and 10 illustrate construction details for components of a post assembly 22. More particularly, FIG. 9 illustrates the manner in which an elbow 60 and a post 62 are removably fastened onto shaft 52 using a steel spring clip 53. Elbow 60 includes an inner diameter cylindrical receiving bore 70 sized to smoothly and snugly receive cylindrical outer surface of shaft 52. A pair of opposed bores 74 and 75 in shaft 52 is configured to align with respective bores 72 and 73 provided in receiver bore 70. Spring clip 53 is then inserted through bores 72-75 to secure elbow 60 and post 62 onto shaft 52. Spring clip 53 enables quick and easy assembly and disassembly of elbow 60 and post 62 from shaft 52. According to one construction, elbow 60 is formed from a cast and machined piece of metal, such as aluminum or steel. According to such construction, elbow 60 is formed from tubular material of generally cylindrical cross section defining an inner bore 70. Female thread 68 is formed in one end of bore 70, and is sized and configured to receive male thread 68 in complementary relation therein. Accordingly, threads in an upper end of thread 66 on an upper end of post 62 are received and engaged in female thread 68 of elbow 60 for either permanent or temporary affixation therebetween.

As shown in FIG. 10, post assembly 22 includes clip 53, elbow 60 and post 62. Elbow 60 is affixed onto a superior end of post 62, whereas a sharp point, or tip 64 is formed in an inferior end of post 62.

In use, post 62 and elbow 60 can first be driven into the ground by a user with either their hands or a mallot, or a piece of wood, after which shaft 52 is then received into elbow 60 and secured with clip 53. Optionally, elbow 60 and post 62 can be first secured onto shaft 52 with clip 53, before tip 64 is urged into the ground.

FIGS. 11-13 illustrate an alternative embodiment for a turkey hunting blind 610 having a support frame configured similar to that used in an umbrella. As shown in FIG. 11, blind 110 is shown in a stowed configuration where a fabric panel 114 has been collapsed onto a central shaft 152 that terminates in a handle 154.

As shown in FIG. 12, hunting blind 110 is shown in an open configuration where fabric panel 114 is fully deployed to reveal a turkey decoy image 112 thereon. Blind 110 includes a primary frame formed by a plurality of steel frame members, or ribs 132-139 that are pivotally supported by shaft 152 at a distal end 156. A runner, comprising a tube fitted over shaft 152 is then connected to a plurality of stretchers 140-147 which connect at an opposite end to respective ones of ribs 132-139, in a manner similar to that presently understood in the umbrella art. A pivotal catch 151 is provided on shaft 152 to secure tubular runner 150 in a position that holds blind 110 in an uncollapsed, or open configuration. Pivotal withdrawal of latch 151 into shaft 152 enables the movement of runner 150 down shaft 152 towards handle 154 which enables collapse of blind 110 into the configuration depicted in FIG. 11.

FIG. 13 illustrates an uncollapsed, or fully deployed configuration of blind 110 so as to illustrate turkey decoy image 112 as provided on a top surface of panel 114. When fully opened, each rib 132-139 is flexed into a bowed configuration which tensions panel 114 into a taut configuration extending from the center portion provided by end 156 all the way to outer periphery 116.

As shown in FIG. 13, turkey decoy image 112 can clearly be seen on a top surface of blind 110. A user is merely required to hold blind 110 by way of handle 154 and shaft 152, thereby enabling a hunter to hide behind panel 114 and present decoy image 112 to a turkey. More particularly, a male turkey will be attracted by turkey decoy image 112 which presents a competing male turkey in "full strut." This will entice the game animal to approach the decoy image 112 while a hunter hides behind panel 114. Viewing screens 24-26 further enable a hunter to view a game animal as it approaches. Before taking a shot, a hunter can close blind 110, or can shoot from an outside, or outer periphery of blind 110.

Figure 14:
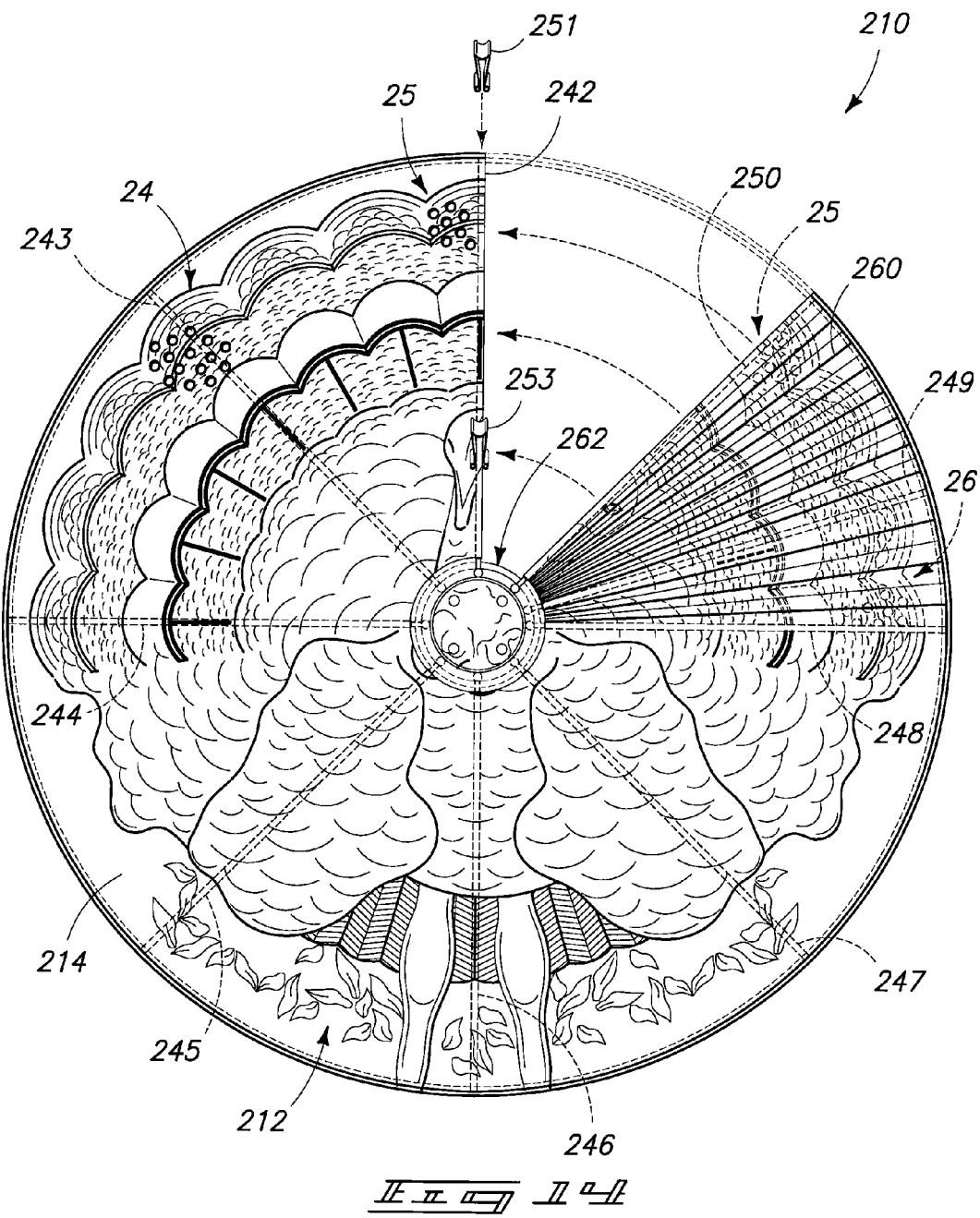
FIG. 14 is a front elevation view of a turkey hunting blind with a decoy image, according to yet another aspect of the present invention.

FIGS. 14-17 illustrate another alternative embodiment for a turkey hunting blind 210 having a support frame configured similar to that used in constructing a folding fan. As shown in FIG. 14, a support frame is provided by a plurality of structural battens 242-250. Battens 242-250 can be formed from thin wood strips, each having a rectangular cross-section. Alternatively, battens 242-250 can be formed from fiberglass, or some other suitable structural material. Batttens 242-250 each provide structural members that move into spaced apart circumferential positions about a central hub 262. Fabric panel 214 is glued onto a front edge of each batten 242-250. Fabric panel has a cylindrical configuration when battens 242-250 are positioned in equally spaced-apart positions about hub 262, but forms pleats, or folds 260 when battens 242-250 are slid about hub to nest together, as described below with reference to FIGS. 15-17.

As shown in FIG. 14, panel 214 includes a turkey decoy image 212 on a front surface. Furthermore, viewing screens 24-26 are provided across an upper portion of panel 214. When unfolded, cylindrical panel 214 is locked into position using a pair of c-shaped spring steel clips 251, 253 that lock together battens 242 and 250.

FIG. 15 shows construction details of hub 262 in exploded perspective view. More particularly, battens, such as battens 242-244, are assembled between a top plate 264 and a bottom plate 266, each formed from a machined piece of aluminum alloy. Threaded fasteners 276-279 pass through bores 272-275 and into complementary threaded bores 596-599 to secure together plates 264 and 266, entrapping battens 542-250 therebetween.

Bottom plate 266 includes a circumferential groove 268 and top plate 264 includes a complementary circumferential groove 270. Each batten includes a steel end fitting 284 with a groove for securing fitting 284 onto an end of a batten, such as battens 242-250, with a pair of rivets 290 and 291. Fitting 284 includes a central arm 288 that holds a guide rod 286 spaced from an end of the batten. Arm 288 passes between a gap provided between plates 264 and 266, while guide rod 286 is guided within grooves 268 and 270. In this manner, each batten is supported for guided movement about hub 262 during unfolding and folding of the respective panel and turkey decoy image. Surface 280 mates in assembly with surface 282 so as to define a groove for receiving arm 288.

FIG. 16 illustrates battens 242-550 unfolded around hub 262 in a circumferentially spaced-apart configuration. Guide rods 286 on each batten 242-250 are guided within cylindrical groove 268, about a center hub defined by end surface 280.

FIG. 17 depicts an exemplary batten 243 guided by guide rod 288 between plates 264 and 266 of hub 262. Panel 214 is shown adhesive mounted atop batten 243. A turkey image is provided on panel 214, along with a complementary portion of such image also provided atop plate 264. Screw 277 retains together plates 264 and 266, in assembly. Fasteners, such as rivets 290. 291 retain end fitting 284 onto a radial inner end of batten 243.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A collapsible hunting blind and decoy for attracting a live turkey having an in-strut full-fan frontal surface area, comprising:
   a primary frame having a folded position and an unfolded position;
   a panel supported by the primary frame having a front surface, a rear surface, and an outer periphery, the panel supported by the primary frame between the folded position and the unfolded position;
   an enlarged image of a male turkey having an in-strut full-fan frontal surface area provided on the front surface of the panel, the image of the male turkey being a front view in full fan and having a larger size for sufficiently hiding a person standing there behind the panel;
   a secondary frame communicating with the panel and configured to hold the primary frame and the panel in the unfolded position, and having an anchor post for holding the front view image of the panel in a vertical position; and
   a plurality of viewing peepholes provided on an upper portion of the image and passed through the panel for allowing a person observing from the rear surface to the front surface.

2. The collapsible hunting blind of claim 1, wherein the panel comprises a canopy and the primary frame comprises a canopy frame.

3. The collapsible hunting blind of claim 2, wherein the primary frame includes a plurality of ribs radiating outward from a common pivot point.

4. The collapsible hunting blind of claim 3, wherein the panel is affixed to each rib of the primary frame.

5. The collapsible hunting blind of claim 1, wherein the secondary frame comprises a radial array of stretchers, each stretcher pivotally coupled with a respective rib of the primary frame and operative to articulate the primary frame between the folded and unfolded positions.

6. The collapsible hunting blind of claim 1, wherein the panel has an octagonal outer periphery.

7. A collapsible bird hunting blind and decoy for attracting a live turkey having an in-strut full-fan frontal surface area, comprising:
   a first frame member having a folded orientation and an unfolded orientation;
   a panel overlaying the first frame member, wherein the panel has a front surface, a rear surface, and an outer periphery, and the first frame member supports the panel in a membrane tensioned state when the first frame member is in the unfolded orientation;
   a greater size image of a male turkey having an in-strut full-fan frontal surface area provided on the front surface of the panel, the image of the male turkey being a front view in full fan and having a larger size for sufficiently hiding a person standing there behind the panel;
   a second frame member communicating with the panel and configured to hold the first frame member and the panel in the unfolded position, and having an anchor post for holding the front view image of the panel in a vertical position; and
   a plurality of viewing peepholes provided on an upper portion of the image and passed through the panel for allowing a person observing from the rear surface to the front surface.

8. The collapsible bird hunting blind of claim 7, wherein the first frame member comprises a central hub and a plurality of radially extending ribs each pivotally supported from the central hub.

9. The collapsible bird hunting blind of claim 8, further comprising a shaft supporting the central hub.

10. The collapsible bird hunting blind of claim 9, wherein the second frame member comprises a runner movably mounted on the shaft and a plurality of stretchers each pivotally connected at one end to the runner and each pivotally connected at another end with a respective one of the ribs, the runner movable along the shaft to articulate each stretcher relative to each rib to fold and unfold the panel.

11. The collapsible bird hunting blind of claim 8, wherein the panel is supported by each of the ribs of the first frame member.

12. The collapsible bird hunting blind of claim 11, wherein the panel includes a series of loops of thread extending in a radial direction from a central portion of the panel.

13. The collapsible bird hunting blind of claim 11, wherein the series of loops of thread comprises a radial array of a series of loops of thread extending from a common point of origin within the panel.

14. A hunter concealment device and decoy for attracting a live turkey having an in-strut full-fan frontal surface area, comprising:
   a canopy frame having a shaft, a central hub, a plurality of ribs each pivotally coupled at a radial inner end to the hub, a sliding ring, and a radial array of stretchers each pivotally coupled at one end with the sliding ring and pivotally coupled at another end with a respective rib, the central hub carried by the shaft, and the sliding ring mounted for movement along the shaft, wherein movement of the sliding ring along the shaft towards the central hub is operative to kinematically articulate the canopy frame between a folded orientation and an unfolded orientation;

a panel having a front surface, a rear surface, and an outer periphery, the panel supported by the canopy frame between stowed and deployed configurations;

a greater size image of a male turkey having an in-strut full-fan frontal surface area provided on the front surface of the panel, the image of the male turkey being a front view in full fan and having a larger size for sufficiently hiding a person standing there behind the panel;

an anchor post communicating with the shaft of the canopy frame for holding the front view image of the panel in a vertical position; and a plurality of viewing peepholes provided on an upper portion of the image and passed through the panel for allowing a person observing from the rear surface to the front surface.

15. The hunter concealment device of claim 14, wherein the canopy frame comprises an umbrella frame.

16. The hunter concealment device of claim 14, further comprising a locking member communicating with the frame member and configured to lock the frame member in the unfolded orientation to present the panel in the deployed configuration.

17. The hunter concealment device of claim 14, wherein the canopy frame and the panel have an octagonal configuration when the canopy frame is unfolded.

18. The hunter concealment device of claim 14, wherein the ribs are flexible ribs and the panel is induced into a membrane tensioned state by flexing of the ribs when the canopy frame is fully deployed so as to present the image of the male turkey.

* * * * *

UNITED STATES PATENT AND TRADEMARK OFFICE
CERTIFICATE OF CORRECTION

| | | |
|---|---|---|
| PATENT NO. | : 7,828,003 B2 | Page 1 of 1 |
| APPLICATION NO. | : 12/038131 | |
| DATED | : November 9, 2010 | |
| INVENTOR(S) | : Tom Montecucco | |

It is certified that error appears in the above-identified patent and that said Letters Patent is hereby corrected as shown below:

Column 4, line 3 – Replace "hunter 10" with --hunter 11--

Column 4, line 14 – Replace "show" with --shown--

Column 8, line 43 – Replace "Batttens" with --Battens--

Column 8, line 63 – Replace "bores 596-599" with --bores 296-299--

Column 8, line 64 – Replace "battens 542-" with --battens 242- --

Column 9, line 12 – Replace "battens 242-550" with --battens 242-250--

Column 9, line 22 – Replace "rivets 290. 291" with --rivets 290 and 291--

Signed and Sealed this

Eleventh Day of October, 2011

David J. Kappos
*Director of the United States Patent and Trademark Office*